United States Patent [19]

Kläntschi et al.

[11] 4,080,290

[45] Mar. 21, 1978

[54] METHOD FOR REMOVING PHOSPHATES FROM AQUEOUS SOLUTIONS

[75] Inventors: Klaus Kläntschi, Uetikon am See; Anton Aregger, Rudolfstetten, both of Switzerland

[73] Assignee: Chemische Fabrik Uetikon, Uetikon am See, Switzerland

[21] Appl. No.: 692,790

[22] Filed: Jun. 4, 1976

[30] Foreign Application Priority Data

Jun. 11, 1975   Germany .............................. 2526053

[51] Int. Cl.² ............................................. C02B 1/14
[52] U.S. Cl. ................................................ 210/37 R
[58] Field of Search ................... 210/24, 37 R, 37 B, 210/38 R, 38 A, 38 B, 38 C, 36, DIG. 29; 260/2.1 R, 2.1 C, 2.1 E, 2.1 M, 2.2 R, 2.2 C

[56]  References Cited

U.S. PATENT DOCUMENTS

| 2,781,290 | 2/1957 | Martin et al. | 260/2.2 C |
| 2,882,248 | 4/1959 | Kennedy | 260/2.2 R |
| 2,888,441 | 5/1959 | Morris | 260/2.2 R |
| 3,310,530 | 3/1967 | White | 210/38 R |
| 3,332,737 | 7/1967 | Kraus | 210/24 |
| 3,663,467 | 5/1972 | Albright | 210/24 |
| 3,984,313 | 10/1976 | Higgins | 210/37 R |

Primary Examiner—Charles N. Hart
Assistant Examiner—Ivars Cintins
Attorney, Agent, or Firm—Gordon W. Hueschen

[57] ABSTRACT

A method for the selective removal of phosphates from an aqueous solution wherein the solution containing phosphates is brought into contact with a water insoluble phosphate-adsorbing complex which consists of multivalent metal ions and organic ligands which in an arrangement suitable for forming a complex contain acid groups either alone or together with groups possessing similar coordination tendency.

14 Claims, No Drawings

METHOD FOR REMOVING PHOSPHATES FROM AQUEOUS SOLUTIONS

The present invention relates to a new and improved method for the selective removal of phosphate ions from aqueous solutions while utilizing phosphate-adsorbing water insoluble complexes of metallic ions containing organic ligands.

Up to the present phosphate was almost exclusively removed from aqueous solutions by chemical precipitation with the aid of salts of calcium, aluminum or iron. Indeed there are also known other different methods where there is eliminated phosphate, for instance by plants or micro-organisms, but such are not often used in practice. The conventional chemical precipitation techniques are generally carried out continuously. This has the drawback that there is always necessary a relatively exact accommodation of the dosing of the metal salt to the momentary inflowing quantity of phosphate. In the case of precipitation techniques associated with good admixing of the already treated quantity of water with the fresh inflowing water and the chemicals, thus for instance in the case of phosphate precpcipitation in the activated sludge stage of a biological waste water purification installation, brief deviations from the correct dosage are not crucial, but also in this instance interruptions lasting over a longer period of time — i.e. in the order of one hour and longer — automatically result in an increase of the phosphate content in the discharge.

Basically there exists the possibility of overcoming this difficulty in that for the purpose of eliminating the phosphate there can be employed an anion exchanger, the absorption rate of which is high enough to insure for an adequate degree of elimination even with maximum inflowing quantities and concentrations. However, the presently known anion exchangers which can be technically employed are however not phosphate selective. If such type non-selective exchangers are employed then such not only absorb the phosphate, as desired, but also other anions and therefore will be more rapidly depleted as soon as such anions are present along with the phosphate in considerable concentrations. This method therefore become expensive since regeneration is more frequently required as are larger installations.

It is known that certain inorganic compounds — for instance metal oxides such as for example aluminum oxide — preferably adsorb phosphate ions. But the technological use of such products for phosphate-elimination from water as previously opposed by either their faulty capacity or the difficulty of regeneration. These primary drawbacks are dispensed with if there are employed compounds as will be described hereinafter for the absorption of the phosphate.

It has been found that certain water insoluble complexes of multivalent metals which also in an aquatized state possess the capability of forming with phosphates precipitants or complexes, possess phosphate-absorbing properties if there are used as the ligands compounds — preferably polymers — which in an arrangement suitable for complex formation contain acid groups either alone or together with groups possessing similar coordination tendancy. Suitable as the acid groups in particular are carboxyl groups and/or sulfonic acid groups alone or combined among themselves or in combination with amide-, amino-, imino-, urethane-, or urea-groups. Such type compounds can be produced by means of an almost unlimited number of methods. The most simple technique is the natural production of the complex if these are used directly commercially obtainable compounds in which the functional groups are already present in the desired arrangement However, it is also possible to easily synthesize random non-commercially available arrangements. Practically directly usable are, for instance, homo- or copolymers of the acrylic acids, methacrylic acids, maleic acids, sulfonated monomers or other acids which can be built into polymers or molecules subsequently easily convertible into such with acryl amide styrene, vinyl ether, ethylene imine and so forth. There are also suitable products which can be easily obtained by the reaction of, for instance epichlorohydrin with glycine or by reacting epoxide resins with, for instance, amine hardners, in that individual places are modified in a manner leading to the introduction of the above-mentioned groups.

The degree of polymerization and the water solubility of the free ligands are only important to the extent that they are capable of influencing the solubility of the thus formed metal complex. There thus can be used both water soluble as well as also water insoluble ligands as long as there are formed therefrom water insoluble complexes. The complexes can be utilized in a pure form or upon a carrier material. The use of carrier materials is especially then advantageous if the reaction product is only slightly swellable with the metal, and therefore, the phosphate exchange reaction only occurs at its surface. In the case of strongly swellable complexes, as obtained for instance from water soluble polymers, the carrier materials do not play the same importance provided that the complexes possess sufficient inherent strength.

The charging of the phosphate exchanger occurs either in a stationary adsorber or by simple suspension of the exchange material in the aqueous solution in a pH-range between 3 and 8. Apart from orthophosphate there are thus also absorbed polyphosphates such as pyro- or tripolyphosphate. The charged exchanger, after the depletion of its capacity, can be regenerated with diluted acid and/or a solution of the metal used for the complex formation and there is again thus obtained the original capacity.

A selection of different organic ligands was combined with a selection of the metal ions basically falling under consideration, whereby it was found that the determined principle is completely valid. In the examples to follow there are described a number of typical combinations. The selection was carried out such that the general validity of the principle will be as clear as possible.

EXAMPLE 1

A product obtained from a diluted solution (25 g /10 l tap water) of up to 40% saponified polyacrylic amide of a molecular weight of $10^6$ (commercially available flocculation agent A3 of applicant, Chemische Fabrik Uetikon, of Uetikon am See, Switzerland) by reaction with concentrated ferric chloride solution, filtration and washing until reaching a neutral and iron free discharge or outflow of the wash water possessed a Fe:C:N ratio of 1:12:2.3 mole and 8.9% Fe related to the organic substance, adsorbed in a solution of $HPO_4^{2-}$ and $H_2PO_4^-$ at pH7 in tap water 9.7 mg P / 10 g wet product containing 85 mg Fe. The residual concentration of the phosphorous in the remaining solution amounted to 0.30 mg P / l.

In the presence of 870 moles chloride / 1 mole phosphorous or 310 mole sulfate / 1 mole phosphorous or 480 mole nitrate / 1 mole phosphorous there was practically no change in the phosphorous take-up.

EXAMPLE 2

A product obtained by precipitation of a one-molar solution of both iron (III) ammonium sulfate as well as gluconic acid with the five-fold volume of a solution containing per liter 10 grams of a partially saponified polyacylric amide corresponding to that of Example 1 but modified by at least one water-soluble salt of a monovalent or bivalent cation, and which product was washed with tap water until there was a neutral and iron-free outflow of the wash water and the product contained a Fe:C:N atom ratio of 1:16:3.1 and for each gram substance contained 15 mg iron, adsorbed from a solution containing $HPO_4^{2-}$ and $H_2PO_4^-$ at pH 7.6 in tap water 4.9 mg P / g dry mass. The resultant residual concentration amounted to 0.55 mg P / 1.

EXAMPLE 3

A product obtained by reacting diethylenetriamine with isocyanate ethyl acetate (the latter obtained from gylcine ester and phosgene) in a molar ration of 1:2, mixing of the thus obtained amine with a stochiometric quantity of "EPOXIDE RESIN XB 2697" obtained from Ciba-Geigy, Basel, Switzerland in methylene chloride solution, hardening for 2 hours at 100° C after drying of the mixture upon the 20-fold quantity of silica gel W of a grain size 0.5–1.5 mm (product of the aforesaid Chemische Fabrik Uetikon), treatment for 2 hours in an excess of 20% iron (III) chloride solution for the saponification of the ester groups and complex formation and subsequent washing until there is obtained a neutral and iron-free outflow of the wash water, which product absorbed 11% iron calculated on the basis of the organic substance, adsorbed from a solution of $HPO_4^{2-}$ and $H_2PO_4^-$ in tap water at a pH of 7 3.6 mg P / g organic substance, with a residual concentration in the remaining solution of less than 1 mg P / 1.

EXAMPLE 4

A product which was obtained with an analogous procedure, however by using an epoxide resin "EPIKOTE 827" of Shell Corporation and had absorbed 7.8% iron related to the organic substance, absorbed 1.2 mg P / g organic substance, with a residual concentration of 0.65 mg P / 1.

EXAMPLE 5

There is formed from the ligands produced according to Example 3 the cerium complex in analogous manner as the iron complex, then the substance formed by taking-up 23% cerium related to the organic material adsorbed 2.2 mg P / g organic substance with a residual content of the phosphorous in the remaining solution of 0.6 mg P / 1.

EXAMPLE 6

A product obtained from acrylic amide (20T), acrylic acid (10T) and N,N' methylenebisacrylic amide (0.3T) in 70T distilled water with nitrogen with 0.5T of an ammonium persulfate - sodium sulfite catalyst system at a temperature of about 80°, comminuted in a kitchen mixer while stirring with excess 5% iron (III) chloride solution, which product was neutral and washed until there was an iron-free outflow of the washing water and contained 5.75% Fe related to the organic substance, adsorbed 7.0 mg P / 10 g wet substance, which contained 76.8 mg iron. The residual concentration in the remaining solution amounted to 3.8 mg P / 1.

EXAMPLE 7

A product obtained according to Example 6 however while using only 0.15 T N,N'-methylenebisacrylic amide, containing 7.8% iron related to the organic substance, adsorbed at a pH of 7.5 in tap water 9.3 mg P / 10 g wet substance which contained 95 mg iron. The residual concentration in the remaining solution amounted to 0.9 mg P / 1.

EXAMPLE 8

The product "DOWEX" A-1, commercially available from Dow Chemical Corporation, a cation exchanger furnishing carboxyl groups and amino groups for complex formations, by reacting with concentrated iron (III) chloride solution was transformed from the sodium-state into the iron-state, where it absorbed approximately 1.3% iron related to the organic substance, adsorbed from tap water having a neutral pH 0.8 mg P / g organic substance and 1.15 mg P / g organic substance respectively, with a residual concentration in the remaining solution of 1.4 mg P / 1 and 5.5 mg P / 1 respectively.

EXAMPLE 9

If a copolymer of methylvinyl ether with maleic acid anhydride in a ratio of 1:1 mole (compound commercially available under the trade name "Gantrez AN 119" from the well known company GAF) in tetrahydrofurane solution is dried on the silica gel used in Example 1 and subsequently reacted with an excess of diethylenetriamine so that there results a mixture containing 14% organic constituent, then the product obtained therefrom by reaction with an iron chloride solution and containing 17% iron related to the organic substance absorbs from tap water having a content of 10 mg P / 1 at a pH 7 until a residual-P-concentration of 0.35 mg/1 in the remaining solution 6.6 mg P / g organic substance.

EXAMPLE 10

The zirconium compound, analogous to Example 9, having a zirconium content of 30% related to the organic substance absorbed 8 mg P / g organic substance in distilled water with a P-content of 10 mg/1 at a pH 3.6.

EXAMPLE 11

A product obtained by copolymerization of maleic anhydride with sytrene in a molar ration of 1:1 in doixane while using a cobalt-MEK-peroxide-catalyst system, drying the reaction mixture on a three-fold excess of silica gel (see Example 3) related to the polymer, reaction of the mixture with iron chloride and washing as in Example 1, and which product had an iron content of 6.3% calculated on the basis of the organic substance, absorbed in distilled water at a pH 7 2.7 mg P / g organic material there being obtained a residual concentration in the remaining solution of 0.15 mg P / 1. With a residual concentration of 5.4 mg P / 1 there was absorbed 0.46 mg P / g organic substance.

EXAMPLE 12

A product obtained by saponification for 2 hours at reflux temperature from 70 T of a commercially available polyacrylic amide (flocculation agent N 3 of the aforementioned Chemische Fabrik Uetikon) in 7000 T water in the presence of 200 T sodium chloride and 10 T sodium hydroxide, subsequent neutralization with diluted hydrochloric acid until reaching a pH 7, saponified to 24% calculated on the totality of the functional groups and reacted with an excess of 1 M iron chloride solution, filtered and washed until there was obtained a neutral and iron-free outflow of the wash water and thereafter containing a Fe:C:N mole-ratio of 1:24:6.1, adsorbed from phosphate-containing tap water at almost neutral pH 9.2 mg P / 10 g wet substance containing 86 mg iron, there being realized a residual concentration in the solution of 0.95 mg P / 1.

With a residual concentration of 8.8 mg P / 1 the same quantity of exchange substance absorbed 17.8 mg P.

EXAMPLE 13

A copolymer obtained within 4 hours by dripping-in 20 T acrylic acid and 12T benzoyl peroxide in 140 T toluene into a boiling solution held under nitrogen of 200 T maleic acid anhydride in 220 T toluene, which after completion of the reaction is separated from the solvent by 149 T diethyl amine in 100 T water, heated for 1 hour, the pH adjusted to 9 and concentrated in a vacuum after reaction with an iron (III) chloride solution absorbed 1.8% iron related to the aqueous substance. This iron complex adsorbed from a phosphate solution at approximately neutral pH respectively 4.9 and 9.8 mg P / 10 g substance with a total content of 180 mg iron, leading to a residual concentration of 0.12 and 0.30 mg P / 1 respectively.

EXAMPLE 14

"AMBERLITE IR 120", a commercially available cation exchanger resin, obtainable from Rohm and Haas Company and containing sulfonic acid groups as the active groups and transformed by iron chloride into the iron state wherein it absorbed 6% iron calculated on the basis of the organic substance, adsorbed 7 mg P / g organic material with a residual concentration in the remaining solution of 44.9 mg P / 1.

EXAMPLE 15

The product resulting from the reaction of 47 g glycine ethyl ester hydrochloride in a mixture of respectively 250 ml purified toluene and isopropanol with 30 ml epichlorohydrin at 70° C in the presence of 40 g pulverized sodium hydroxide, concentrated for drying in vacuum, taken-up in 200 ml water and hydrolized with 50 ml 5N-HCl at 100° C, diluted with water, and reacted at room temperature with excess iron (III) solution, filtered and washed with water until neutral, adsorbed from an aqueous solution containing 10 mg P / 1 at a pH 7.6 2 mg P / 2 g aqueous substance, containing 35.2 mg iron with a residual concentration 0.1 mg P / 1.

EXAMPLE 16

The adsorption of higher phosphates from solutions of different final concentrations and at different final pH will be apparent from the following Table. As the exchange substance there is used the product described in Example 1. As the starting solutions there were used for the trials with distilled water orthophosphate solutions at a pH 7.08, pyrophosphate solutions at a pH 7.15 and tripolyphosphate solutions at a pH 7.28, where during the trials with tap water appropriate solutions were used having a pH of 7.50, 7.40 and 7.45 respectively.

| | After Changing | | | |
| --- | --- | --- | --- | --- |
| | Tests in Distilled Water | | Tests in Tap Water | |
| Employed Phosphate | Adsorption mg P/g org. Substance | Remaining Solution mg P/1 pH | Adsorption mg P/g org. Substance | Remaining Solution mg P/1 pH |
| $PO_4$ | 5,2 | 0,05  4,35 | 4,8 | 0,05  7,32 |
| $PO_4$ | 7,0 | 3,35  4,95 | 9,1 | 0,6  7,12 |
| $P_2O_7$ | 5,1 | 0,15  5,28 | 4,7 | 0,2  7,32 |
| $P_2O_7$ | 5,5 | 4,75  5,38 | 8,2 | 1,55  7,20 |
| $P_3O_{10}$ | 4,9 | 0,30  5,35 | 4,7 | 0,15  7,32 |
| $P_3O_{10}$ | 5,4 | 4,85  5,20 | 8,4 | 1,35  7,05 |
| $PO_4/P_2O_7(1/1)$ | 4,4 | 5,80  5,75 | 9,0 | 0,75  7,25 |
| $PO_4/P_3O_{10}(1/1)$ | 6,8 | 3,55  5,28 | 9,2 | 0,55  7,20 |
| $PO_4/P_2O_7/P_3O_{10}$ (1/1/1) | 6,6 | 3,75  5,38 | 8,9 | 0,85  7,18 |

EXAMPLE 17

A product produced according to Example 11 and treated, however, prior to reaction with the iron chloride with an excess of ethylene diamine, and which absorbed 2.75% iron calculated on the basis of the organic substance, adsorbed 3.0 mg P / g organic substance with a residual concentration of the remaining solution of 7.25 mg P / 1.

EXAMPLE 18

If the reaction product mentioned in Example 17 is reacted with zirconium chloride instead of with iron, then there is formed a product having a zirconium content of 8.3% related to the organic substance and which adsorbed 9.6 mg P / g organic substance with a residual concentration of 0.40 mg P / 1.

EXAMPLE 19

The corresponding lanthanum compound obtained by reaction of the ligand of Example 17 with lanthanum chloride, and which compound contains 5% lanthanum calculated with respect to the organic substance, absorbed 6.4 mg P / g organic substance with a residual concentration in the remaining solution of 3.60 mg P / 1.

EXAMPLE 20

The analogous aluminium compound contains 1.25% aluminium calculated on the basis of the organic substance and adsorbed, with a residual concentration of 7.45 mg P / 1, 2.5 mg P / g organic substance.

EXAMPLE 21

The analogous cerium complex contained 4.7 cerium and adsorbed, with a residual concentration of 0.95 mg P / 1, 9.1 mg Cer/g organic substance.

EXAMPLE 22

A thorium compound obtained analogous to Example 1 and containing 48.7 mg thorium for each 2 g wet product, adsorbed from an aqueous orthophosphate solution 4.5 mg P /10 g wet exchanger material at a residual concentration of 0.5 mg P / 1 and 9.25 mg P / 10 g mass respectively, at 0.75 mg P / 1.

In the presence of 100 moles chloride / 1 mole phosphorous or sulfate or nitrate the phosphorous take-up hardly changed.

Having now discussed in considerable detail illustrative and preferred embodiments of the invention, it should be apparent that the objects set forth at the outset of this specification have been satisfied. ACCORDINGLY,

What is claimed is:

1. A method for the selective removal of phosphates from an aqueous solution comprising the steps of bringing a solution containing the phosphate into contact with a water insoluble, phosphate absorbing coordination complex composed of multivalent metal cations coordinated in organic ligands by acid groups, in which the coordination complex is formed by a process consisting essentially of treating the organic ligands with a solution of a salt of the multivalent metallic cations and then washing the thus obtained coordination complex with water until the wash water is neutral and essentially free of said salt solution.

2. The method as defined in claim 1, wherein the cordination comples is a chelate.

3. The method as defined in claim 1, wherein the acid groups comprise carboxyl groups.

4. The method as defined in claim 1, wherein the acid groups comprise sulfonic acid groups.

5. The method as defined in claim 1, wherein the organic ligand comprises a partially saponified polymer of a member selected from the groups consisting essentially of methacrylic amide or acrylic amide.

6. The method as defined in claim 1, wherein the organic ligand comprises a copolymer of methyalacrylic amide or acrylic amide with methacrylic acid or acrylic acid.

7. The method as defined in claim 1, wherein the organic ligand is a copolymer of maleic acid or its anhydride.

8. The method as defined in claim 1, wherein the organic ligand is obtained by reaction of an epoxide with a member selected from the group consisting of an amine and polyamine and which previously was partially reacted with an isocyanate.

9. The method as defined in claim 1, wherein the organic ligand is the reaction product of an amino carbonic acid or its ester with at least one member selected from the group essentially consisting of an epoxide and an halogenide.

10. The method as defined in claim 1, wherein the organic ligand is the reaction product of an ester of an amino carbonic acid with epichlorohydrin.

11. The method as defined in claim 1, wherein the organic ligand is a macromolecule containing an amino carboxylic acid group.

12. The method as defined in claim 1, wherein the organic ligand is a polymer containing a sulfonic acid group.

13. The method as defined in claim 1, wherein the multivalent metal cations comprise iron.

14. The method as defined in claim 1, wherein the multivalent metal cations comprise a member selected from the group consisting essentially of aluminium, zirconium, thorium and rare earth metals.

* * * * *

UNITED STATES PATENT OFFICE
CERTIFICATE OF CORRECTION

Patent No. 4,080,290          Dated March 21, 1978

Inventor(s) Klaus Klantschi Anton Aregger

It is certified that error appears in the above-identified patent and that said Letters Patent are hereby corrected as shown below:

Col. 5, line 34; "$PO_4/P_2O_7 1/1)$" should read --$PO_4/P_2O_7 (1/1)$--

Signed and Sealed this

Third Day of October 1978

[SEAL]

Attest:

RUTH C. MASON
*Attesting Officer*

DONALD W. BANNER
*Commissioner of Patents and Trademarks*